(12) United States Patent
Adams

(10) Patent No.: US 9,958,709 B2
(45) Date of Patent: May 1, 2018

(54) DYNAMIC OPTICAL VALVE FOR MITIGATING NON-UNIFORM HEATING IN LASER PROCESSING

(71) Applicant: Applied Materials, Inc., Santa Clara, CA (US)

(72) Inventor: Bruce E. Adams, Portland, OR (US)

(73) Assignee: APPLIED MATERIALS, INC., Santa Clara, CA (US)

(*) Notice: Subject to any disclaimer, the term of this patent is extended or adjusted under 35 U.S.C. 154(b) by 774 days.

(21) Appl. No.: 14/459,016

(22) Filed: Aug. 13, 2014

(65) Prior Publication Data

US 2015/0048062 A1 Feb. 19, 2015

Related U.S. Application Data

(60) Provisional application No. 61/866,724, filed on Aug. 16, 2013.

(51) Int. Cl.

| | |
|---|---|
| *B23K 26/06* | (2014.01) |
| *G02F 1/01* | (2006.01) |
| *G02F 1/19* | (2006.01) |
| *B23K 26/00* | (2014.01) |
| *B23K 26/08* | (2014.01) |
| *B23K 26/0622* | (2014.01) |

(Continued)

(52) U.S. Cl.
CPC ........ *G02F 1/0147* (2013.01); *B23K 26/0006* (2013.01); *B23K 26/0066* (2013.01); *B23K 26/0622* (2015.10); *B23K 26/0648* (2013.01); *B23K 26/0853* (2013.01); *G02F 1/19* (2013.01); *B23K 2201/40* (2013.01); *B23K 2203/56* (2015.10); *G02F 2201/08* (2013.01); *G02F 2201/346* (2013.01)

(58) Field of Classification Search
CPC ................. H01L 21/268; H01L 21/324; H01L 21/67115; B23K 2201/40; B23K 26/0622
USPC .......... 438/795; 219/121.61, 121.65, 121.63, 219/390; 257/E21.347, E21.324; 359/288, 237
See application file for complete search history.

(56) References Cited

U.S. PATENT DOCUMENTS 6,173,116 B1 * 1/2001 Roozeboom .......... C30B 25/105
 118/724
6,303,476 B1 * 10/2001 Hawryluk .............. B23K 26/18
 257/E21.324

(Continued)

FOREIGN PATENT DOCUMENTS

WO 2006/013163 A1 2/2006

OTHER PUBLICATIONS

PCT Notification of Transmittal of the International Search Report and the Written Opinion of the International Searching Authority for International Application No. PCT/US2014/050952 dated Nov. 25, 2014; 11 total pages.

*Primary Examiner* — Dana Ross
*Assistant Examiner* — Lawrence Samuels
(74) *Attorney, Agent, or Firm* — Patterson + Sheridan LLP

(57) ABSTRACT

Embodiments of the present invention generally relate to an optical valve that modifies a laser beam to allow more energy to be irradiated onto less absorbing areas on a substrate and less energy to be irradiated onto more absorbing areas on the substrate, thus creating a more uniform heating field. The optical valve is a layered structure comprising a reflective switch layer, an absorbing layer, a thermal resistor and a thermal bath.

20 Claims, 5 Drawing Sheets

(51) Int. Cl.
*B23K 101/40* (2006.01)
*B23K 103/00* (2006.01)

(56) References Cited

U.S. PATENT DOCUMENTS

| | | | |
|---|---|---|---|
| 6,479,821 B1* | 11/2002 | Hawryluk | G03G 5/16 250/316.1 |
| 6,635,588 B1* | 10/2003 | Hawryluk | B23K 26/18 257/E21.134 |
| 7,154,066 B2 | 12/2006 | Talwar et al. | |
| 8,309,474 B1 | 11/2012 | Wang et al. | |
| 8,674,257 B2* | 3/2014 | Li | B23K 26/0648 219/121.65 |
| 2002/0019148 A1 | 2/2002 | Hawryluk et al. | |
| 2002/0022294 A1 | 2/2002 | Hawryluk et al. | |
| 2003/0015710 A1* | 1/2003 | Vieira | H01S 5/0687 257/76 |
| 2003/0183612 A1* | 10/2003 | Timans | C30B 31/12 219/390 |
| 2004/0150331 A1* | 8/2004 | Okubo | G02F 1/133305 313/506 |
| 2007/0285775 A1* | 12/2007 | Lesage | G02F 1/0147 359/465 |
| 2008/0182207 A1 | 7/2008 | Yamazaki et al. | |
| 2008/0227232 A1* | 9/2008 | Yamazaki | G02F 1/136286 438/34 |
| 2009/0120924 A1* | 5/2009 | Moffatt | B23K 26/0626 219/385 |
| 2012/0037068 A1* | 2/2012 | Su | C23C 16/4586 117/95 |
| 2012/0325784 A1 | 12/2012 | Moffatt et al. | |
| 2013/0114121 A1* | 5/2013 | Hong | G02B 5/285 359/290 |

* cited by examiner

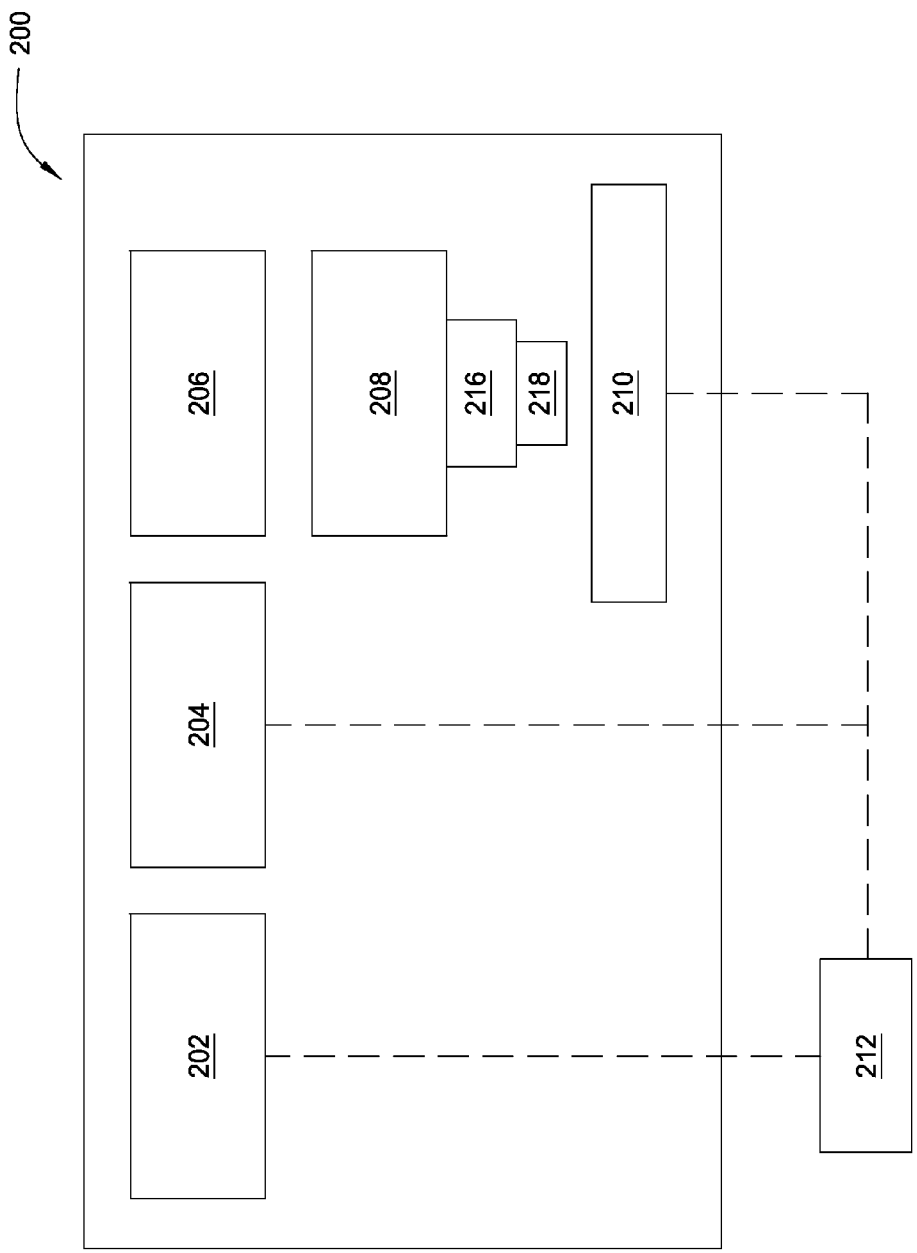

DYNAMIC OPTICAL VALVE FOR MITIGATING NON-UNIFORM HEATING IN LASER PROCESSING

CROSS-REFERENCE TO RELATED APPLICATIONS

This application claims priority to U.S. Provisional Patent Application Ser. No. 61/866,724, filed on Aug. 16, 2013, which herein is incorporated by reference.

BACKGROUND

Field

Embodiments described herein relate to apparatus and methods of thermal processing. More specifically, apparatus and methods described herein relate to laser thermal treatment of semiconductor substrates.

Description of the Related Art

Thermal processing is commonly practiced in the semiconductor industry. Semiconductor substrates are subjected to thermal processing in the context of many transformations, including doping, activation, and annealing of gate source, drain, and channel structures, siliciding, grain growth, crystallization, oxidation, and the like. Over the years, techniques of thermal processing have progressed from simple furnace baking, to various forms of increasingly rapid thermal processing such as rapid thermal processing (RTP), spike annealing, and laser annealing.

Conventional laser annealing processes use laser emitters that may be semiconductor, excimer, gas, or solid state lasers with optics that focus, defocus, or variously image the laser light into a predetermined shape. One approach is to focus the laser onto a rectangle that generally corresponds to one or more integrated circuit dies formed on a substrate. Each die is processed by pulsing the laser, and stepping die by die across the substrate. The surface of the substrate may have various optical absorbances, leading to non-uniform temperatures across the surface. This differential heating creates a difference in process results known as the "pattern effect" as it often follows the die pattern on the substrate. The pattern effect has become one of the largest problems for process integration and the acceptance of laser processing tools into production. Thus, there is a need for new apparatus and methods for thermal processing of semiconductor substrates.

SUMMARY

Embodiments of the present invention generally relate to an optical valve that modifies a laser beam to allow more energy to be irradiated onto less absorbing areas on a substrate and less energy to be irradiated onto more absorbing areas on the substrate, thus creating improved temperature uniformity across the field. The optical valve has four thermal-optical characteristics: reflective switch, optical absorbance, thermal resistance and thermal capacitance. The optical valve may be a layered structure comprising a reflective switch layer, an absorbing layer, a thermal resistor and a thermal bath, or a single layer having several characteristics.

In one embodiment, an optical valve is disclosed. The optical valve comprises a thermal bath layer, a thermal resistor layer, an absorbing layer and a reflectivity switch layer.

In another embodiment, an apparatus for thermally processing a substrate is disclosed. The apparatus comprises a substrate support, a source of electromagnetic energy operable to produce pulses of electromagnetic energy, an optical system comprising a pulse combiner, a pulse shaper, a homogenizer and an aperture member positioned to receive pulses of electromagnetic energy from the source, and an optical valve incorporated into the aperture member.

In another embodiment, a method for thermally processing a substrate is disclosed. The method comprises directing a laser pulse through an optical valve onto a surface of the substrate. The surface has more optical energy absorbing regions and less optical energy absorbing regions. The method further comprises reflecting an amount of energy back to the optical valve when the laser pulse is delivered to the less optical absorbing region, and changing a reflectivity of the optical valve as a temperature of the optical valve is increased due to the reflected amount of energy.

In another embodiment, an optical valve is disclosed. The optical valve includes an absorbing layer and a reflectivity switch layer. The reflectivity switch layer has a peak reflectance at a wavelength that is different than a wavelength of electromagnetic energy directed to the optical valve, and the wavelength of the peak reflectance of the reflectivity switch layer changes as a temperature of the reflectivity switch layer increases.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a schematic diagram of a thermal processing apparatus incorporating the optical valve according to one embodiment of the invention.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present invention generally relate to an optical valve that modifies a laser beam to allow more energy to be irradiated onto less absorbing areas on a substrate and less energy to be irradiated onto more absorbing areas on the substrate, thus creating a more uniform temperature field. The optical valve may be a layered structure comprising a reflective switch layer, an absorbing layer, a thermal resistor and a thermal bath.

Figure 1:
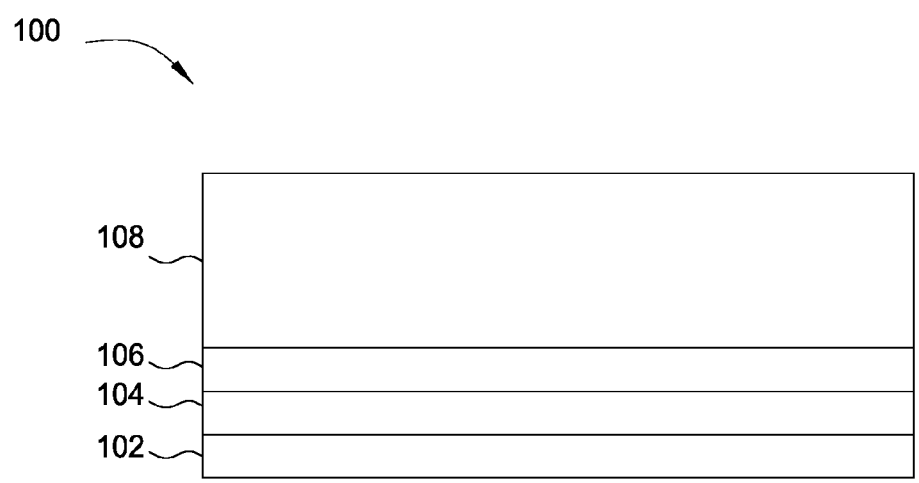
FIG. 1 is a schematic of an optical valve according to one embodiment of the invention.

FIG. 1 is a schematic of an optical valve 100 according to one embodiment of the invention. The optical valve 100 is a layered structure having a reflectivity switch layer 102, an absorbing layer 104, a thermal resistor layer 106 and a thermal bath layer 108. The optical valve 100 may be placed between a laser source and a substrate in a thermal processing apparatus. As shown in FIG. 1, the absorbing layer 104 is disposed on the reflectivity switch layer 102, the thermal resistor layer 106 is disposed on the absorbing layer 104, and the thermal bath layer 108 is disposed on the thermal resistor layer 106. However, the optical valve 100 may have an opposite structure that the thermal bath layer 108 is at the bottom, the thermal resistor layer 106 is disposed over the thermal bath layer 108, the absorbing layer 104 is disposed over the thermal resistor layer 106, and the reflectivity switch layer 102 is disposed over the absorbing layer 104. During operation, laser energy, such as a laser pulse, is directed to the substrate through the optical valve 100.

The reflectivity switch layer 102 may be a dielectric stack including sub layers of dielectric material such as titanium oxide, tantalum oxide or the like. The reflectivity switch layer 102 may comprise multiple layers. The reflectivity of the reflectivity switch layer 102 is a function of the wavelength of light incident on the reflectivity switch layer 102. The reflectivity switch layer 102 has a reflectivity spectrum that changes when there is a change in temperature. As the reflectivity spectrum changes with temperature, the reflectivity at a given wavelength, such as the wavelength of a laser pulse used for thermal processing, changes. Depending on the material, the reflectivity at a given wavelength may increase or decrease as the reflectance spectrum changes with temperature.

The material of the reflectivity switch layer 102 may be chosen such that a peak of the reflectance spectrum is near the wavelength of the light used for thermal processing. The material of the reflectivity switch layer 102 may also be chosen such that the peak reflectance changes with temperature in a desired way. The peak of the reflectance spectrum may shift from a lower wavelength to a higher wavelength as temperature increases, or from a higher wavelength to a lower wavelength. If the peak of the reflectance spectrum moves further from the wavelength of the incident light, reflectivity of the reflectivity switch layer 102 will decrease. If the peak of the reflectance spectrum moves closer to the wavelength of the incident light, reflectivity of the reflectivity switch layer 102 will increase. In one embodiment, the reflectivity of the reflectivity switch layer 102 decreases as the temperature increases. In another embodiment, the reflectivity of the reflectivity switch layer 102 increases as the temperature increases. A decrease in reflectivity means more laser energy is passing through the reflectivity switch layer 102, and an increase in reflectivity means less laser energy is passing through the reflectivity switch layer 102.

The change in reflectivity, or the shift in peak spectral reflectance, may be based on the layer thickness, or on physical property changes, such as from a difference in thermal expansion with a change in temperature between different materials. In one embodiment, the reflectivity switch layer 102 has a peak spectral reflectance at a wavelength that is adjacent to the wavelength of the laser. As the temperature increases, the reflectivity of the reflectivity switch layer 102 may decrease, i.e., shifting further away from the laser wavelength, causing the optical valve 100 to reflect less laser energy as the laser pulse is passing through the optical valve 100. In another embodiment, the reflectivity switch layer 102 may increase reflectivity as the temperature increases. An increase in reflectivity reflects more laser energy, allowing less laser energy to reach the heat sensitive devices on the substrate.

The dynamic response time of the reflectivity switch layer 102 is typically very fast, and may be less than the laser pulse duration. In one embodiment, the dynamic response time is between 4 nano seconds (ns) and 50 ns.

The absorbing layer 104 may be a very thin layer of metal or oxide of a metal, such as chrome oxide. The absorbing layer 104 is at least very slightly absorbing to the laser wavelength, allowing the absorbing layer 104 to be heated by the laser energy. The absorbing layer 104 has an absorbance spectrum that includes the wavelength of the laser energy, and converts the laser energy to heat which heats the reflectivity switch layer 102.

The thermal resistor layer 106 may be amorphous silicon oxide. The thermal resistor layer 106 may control heat flow from the reflectivity switch layer 102 into the thermal bath layer 108 to achieve a target temperature behavior in response to reflectivity of the substrate. The thermal resistor layer 106 is designed for a specific pulse duration to allow maximum increase in transmission before saturation occurs. The thermal resistor layer 106 has resistivity attuned to the system so the reflectivity switch layer 102 reaches a target temperature in a desired time. The resistivity of the thermal resistor layer 106 may be adjusted by composition, density or thickness. In addition, thermal runaway to saturation is prevented by leaking heat through the thermal resistor layer 106 to the thermal bath layer 108.

The thermal bath layer 108 may be a single layer or a multiple layered structure that helps dissipating heat. In one embodiment, the thermal bath layer 108 comprises aluminum oxide. The thermal bath layer 108 and the thermal resistor layer 106 may or may not be partially absorbent to the laser wavelength.

Some or all of the characteristics of layers 102, 104, 106, 108 may be integrated in a single layer. In one embodiment, silicon oxide is used for its high thermal resistance and for its high enough thermal heat capacity to function as the thermal bath, depending on the application the device is designed for. In another embodiment, materials used for the reflectivity switch layer 102 may have some optical absorbance and thus will heat the layer 102 directly. In another embodiment, the absorbing layer 104 may be co-deposited with the reflectivity switch layer 102.

FIG. 2 is a schematic diagram of a system 200 for laser processing of substrates. The system 200 comprises an energy module 202 that has a plurality of pulsed laser sources producing a plurality of pulsed laser pulses, a pulse control module 204 that combines individual pulsed laser pulses into combination pulsed laser pulses, and that controls intensity, frequency characteristics, and polarity characteristics of the combination pulsed laser pulses, a pulse shaping module 206 that adjusts the temporal profile of the pulses of the combined pulsed laser pulses, a homogenizer 208 that adjusts the spatial energy distribution of the pulses, overlapping the combination pulsed laser pulses into a single uniform energy field, an aperture member 216 that removes residual edge non-uniformity from the energy field, and an alignment module 218 that allows precision alignment of the laser energy field with a substrate disposed on a substrate support 210. A controller 212 is coupled to the energy module 202 to control production of the laser pulses, the pulse control module 204 to control pulse characteristics, and the substrate support 210 to control movement of the substrate with respect to the energy field.

The lasers may be any type of laser capable of forming short pulses, for example duration less than about 100 ns, of high power laser radiation. Typically, high modality lasers having over 500 spatial modes with $M^2$ greater than about 30 are used. Solid state lasers such as Nd:YAG, Nd:glass, titanium-sapphire, or other rare earth doped crystal lasers are frequently used, but gas lasers such as excimer lasers, for example $XeCl_2$, ArF, or KrF lasers, may be used. The lasers may be switched, for example by q-switching (passive or active), gain switching, or mode locking. A Pockels cell may also be used proximate the output of a laser to form pulses by interrupting a beam emitted by the laser. In general, lasers usable for pulsed laser processing are capable of producing pulses of laser radiation having energy content between about 100 mJ and about 10 J with duration between about 1 ns and about 100 µsec, typically about 1 J in about 8 ns. The lasers may have wavelength between about 200 nm and about 2,000 nm, such as between about 400 nm and about 1,000 nm, for example about 532 nm. In one embodiment, the lasers are q-switched frequency-doubled Nd:YAG lasers. The lasers may all operate at the same wavelength, or one or more of the lasers may operate at different wavelengths from the other lasers in the energy module 202. The lasers may be amplified to develop the power levels desired. In most cases, the amplification medium will be the same or similar composition to the lasing medium. Each individual laser pulse is usually amplified by itself, but in some embodiments, all laser pulses may be amplified after combining.

A typical laser pulse delivered to a substrate may be a combination of multiple laser pulses. The multiple pulses are generated at controlled times and in controlled relationship to each other such that, when combined, a single pulse of laser radiation results that has a controlled temporal and spatial energy profile, with a controlled energy rise, duration, and decay, and a controlled spatial distribution of energy non-uniformity. In other embodiments, multiple laser pulses may be separated temporally to the extent that the resulting combined energy is a pulse train. The controller 212 may have a pulse generator, for example an electronic timer coupled to a voltage source, that is coupled to each laser, for example each switch of each laser, to control generation of pulses from each laser.

The optical valve 100 may be placed between the energy module 202 and the substrate disposed on the substrate support 210. In one embodiment, the optical valve 100 may be coupled to, or incorporated into, the aperture member 216. During operation, the optical valve 100 allows proportionally more energy to reach the less absorbing regions of the substrate, greatly reducing the pattern effect. The operation of one embodiment of the optical valve 100 is described in detail below. The embodiment described below features a reflectivity switch layer that reflects less energy as temperature of the reflectivity switch layer rises.

As the laser pulse propagates through the optical valve 100, a small amount energy is absorbed by the absorbing layer 104, a small amount of energy is reflected by the reflectivity switch layer 102, and most of the energy passes onto the substrate. The surface of the substrate is typically not uniform in optical absorbance. Some regions of the substrate absorb less energy and reflect more energy than others. The less absorbing regions reflect an amount of the laser energy not absorbed back to the optical valve 100. This amount of energy heats some portion of the absorbing layer 104, causing the temperature of this portion of the absorbing layer 104 to increase. The heated absorbing layer 104 in turn heats the reflectivity switch layer 102, causing the temperature of the reflectivity switch layer 102 to increase. The reflectivity switch layer 102 is designed to undergo a shift in the peak spectral reflectance with a temperature change. In this embodiment, the change in the peak spectral reflectance allows more laser energy to reach the less absorbing regions, partially compensating for the variation in absorbance across the substrate. In another embodiment in which it is desired to protect thermally sensitive devices formed on a substrate, the change in the peak spectral reflectance may allow less laser energy to reach the less absorbing regions to reduce thermal energy exposure in those regions.

Figure 3A:
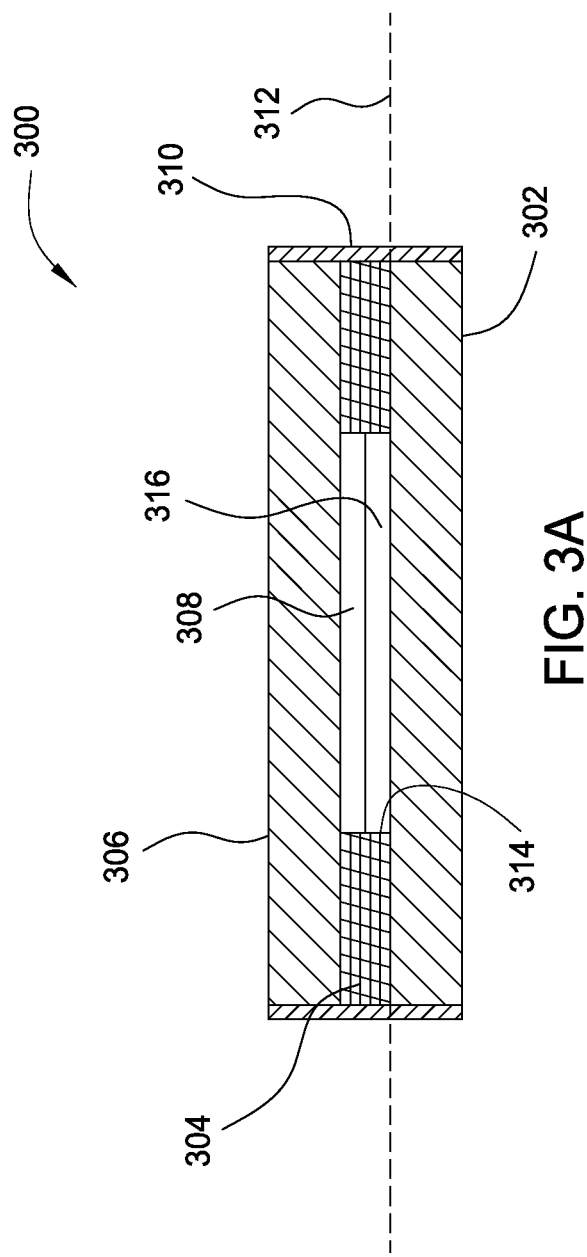
FIGS. 3A-3C are a side view of an aperture member having the optical valve according to one embodiment of the invention.
Figure 3B:
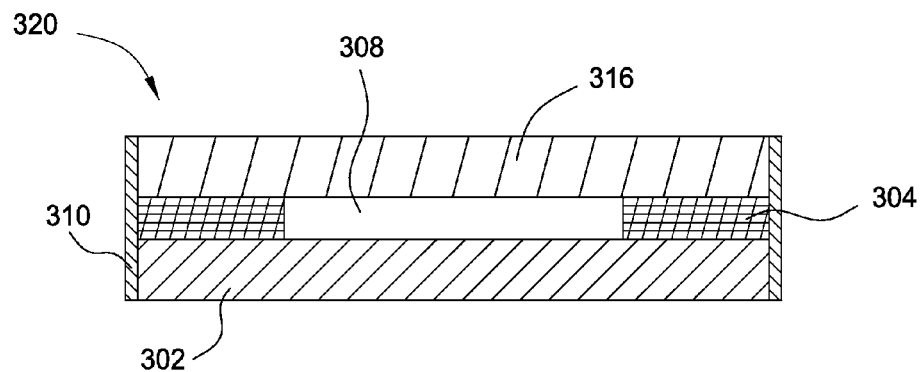
Figure 3C:
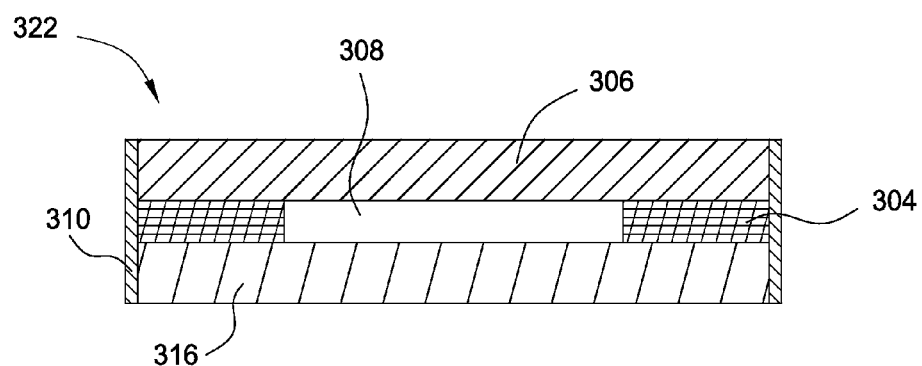

In some embodiments, the optical valve 100 is proximity focused onto the substrate. In other words, the optical valve 100 is proximity focused onto a plane adjacent to the substrate support 210. In this case the substrate is separated from the optical valve 100 by a small gap. The maximum gap between the substrate and the optical valve 100 may depend on the thermal diffusion distance of the substrate and the numerical aperture of the laser optics. Typically, the optical valve 100 is positioned as close as possible to the substrate, so the laser energy reflected back from the substrate is not significantly defocused. In another embodiment, the optical valve is incorporated into the aperture member 216. FIGS. 3A-3C illustrate such aperture member.

FIG. 3A is a side view of an aperture member 300 having the optical valve 100 disposed therein. The aperture member 300 has a first member 302 that is substantially transparent to selected forms of energy, such as light or laser radiation having a selected wavelength. An energy blocking member 304, which may be opaque or reflective, is formed over a portion of a surface of the first member 302 defining an opening 308 through which energy will pass in the shape of the opening 308. A second member 306 is disposed over the first member 302 and the energy blocking member 304, covering the opening 308. The second member 306 is also substantially transparent to the energy to be transmitted through the aperture member 300, and may be the same material as the first member 302. The edges of the aperture member 300 may be enclosed by a covering 310 that ensures particulates do not enter the opening 308.

The aperture member 300 may be positioned such that the energy blocking member 304 is at a focal plane 312 of the energy incident on the aperture member 300, ensuring a precise truncation of the energy field. Because the opening 308 is positioned at the focal plane 312 of the energy in such an embodiment, any particles that collect in the opening, for example on the surface of the first member 302, cast shadows in the transmitted energy field that lead to non-uniform processing of a substrate. Covering the opening 308 with the second member 306 and enclosing the edges of the aperture member 300 ensures that any particles adhering to the aperture member 300 are far enough from the focal plane 312 to be out of focus in the final energy field so that variation in intensity of the final energy field due to the shadows of the particles is reduced.

The first and second members 302 and 306 are typically made from the same material, usually glass or quartz. The first and second members 302 and 306 can also be a Pellicle film as commonly used to protect photomask and are usually made from a very thin polymer film, commonly nitrocellulose or Teflon®. The energy blocking member 304 may be an opaque or reflective material, such as metal, reflective ceramic, or a dielectric mirror. The energy blocking member 304 may be formed and shaped, and the formed and shaped energy blocking member 304 applied to the first member 302 by direct contact, or formed directly by physical vapor deposition (PVD) technologies commonly used to from robust thin film in the optics industry. Alternately, the energy blocking member 304 may be deposited on the first member 302 and then etched to provide the opening 308. The second member 306 is typically applied to the energy blocking member 304 using techniques common to the high energy optics industry, such as direct bonding, an air gap, or UV curing epoxies.

The covering 310 should form a hermetic seal to prevent the degradation of the films due to moisture. The covering may be an adhesive or a hard material applied using an adhesive. Alternately, if appropriate, the covering may be formed by melt-fusing the edges of the first and second members 302 and 306 with the edge of the energy blocking member 304.

To manage refractive effects of the aperture member 300, the side walls of the opening 308, defined by an interior edge 314 of the energy blocking member 304, may be tapered, angled, or slanted to match the propagation direction of photons emerging from the homogenizer 208.

An optical valve 316 may be disposed in the opening 308. The optical valve 316 may be the same as the optical valve 100 described in FIG. 1. The optical valve 316 may be coplanar with the focal plane 312. The optical valve 316 may be placed in the aperture member at other locations. In the embodiment of FIG. 3B, the optical valve 316 replaces the second member 306. Thus, in addition to providing more uniform heating, the optical valve 316 in an aperture member 320 also helps block contaminants from entering into the opening 308. In another embodiment, the optical valve 316 may replace the first member 302 in an aperture member 322, as shown in FIG. 3C.

Figure 4:
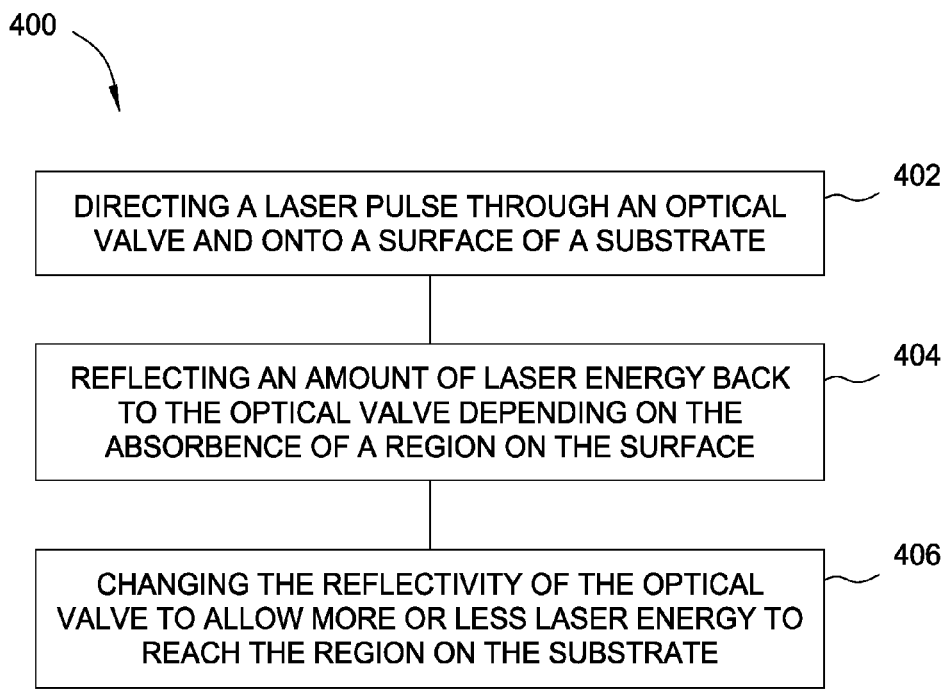
FIG. 4 is a processing sequence according to one embodiment of the invention.

FIG. 4 is a processing sequence 400 according to one embodiment of the invention. The processing sequence 400 is performed to reduce the pattern effect as described above. At step 402, a laser pulse is directed through an optical valve and onto a surface of a substrate. The laser pulse may be delivered by any type of laser capable of forming short pulses, and the laser pulse may have energy content between about 100 mJ and about 10 J with duration between about 1 ns and about 100 micro seconds. The laser may have wavelength between about 200 nm and about 2,000 nm, such as between about 400 nm and about 1,000 nm, for example about 532 nm. The laser pulse delivered to the substrate may be a combination of multiple laser pulses.

Next at step 404, an amount of energy is reflected back and re-imaged onto the optical valve based on the absorbance of the region on the surface of the substrate. With a more absorbing region, little energy is reflected back to the corresponding portion. With a less absorbing region, the amount of energy reflected back is capable to heat the corresponding portion of the optical valve to a higher temperature. At step 406, this increase in temperature changes the reflectivity of the optical valve to allow more energy to reach the less absorbing region on the surface of the substrate. As a result, a substrate having a non-uniform optical absorbance may be uniformly heated by the laser energy. Alternatively, if a heat sensitive device is located on the less absorbing region, the reflectivity of the optical valve may be increased to prevent more laser energy to reach the device.

An optical valve may be used to modulate energy absorption of a substrate during laser thermal processing. The reflectivity of the optical valve may change based on temperature, thus allowing more or less laser energy to pass through the optical valve and onto the substrate. The optical valve may be placed in an aperture member disposed between a laser source and the substrate. During operation, the amount of energy delivered to the substrate is controlled by the optical valve, so more energy is delivered to less absorbing regions. As a result, pattern effect is greatly reduced.

Although the above descriptions are of pulsed laser systems, the techniques described may also be applied to, or with, continuous laser systems where the laser light is scanned across a substrate (or the substrate moves beneath the laser light) to process the entire surface of the substrate. A common approach is to image the laser light into a spot, line, or thin rectangle image, and stitch the scanned areas by overlapping the processed areas.

While the foregoing is directed to embodiments of the present invention, other and further embodiments of the invention may be devised without departing from the basic scope thereof, and the scope thereof is determined by the claims that follow.

The invention claimed is:

1. An apparatus for thermally processing a substrate, comprising an optical valve, the optical valve comprising:
   a thermal bath layer comprising aluminum oxide;
   a thermal resistor layer in contact with the thermal bath layer;
   an absorbing layer; and
   a reflectivity switch layer.

2. The apparatus of claim 1, wherein the thermal resistor layer comprises silicon oxide.

3. The apparatus of claim 2, wherein the absorbing layer comprises a metal.

4. The apparatus of claim 3, wherein the reflectivity switch layer comprises dielectric stack including sub layers of dielectric material, wherein the dielectric material includes titanium oxide or tantalum oxide.

5. The apparatus of claim 1, wherein the thermal resistor layer has a thermal resistivity that controls a temperature of the reflectivity switch layer.

6. An apparatus, comprising:
   a substrate support;
   a source of electromagnetic energy operable to produce pulses of electromagnetic energy that propagate toward the substrate support; and
   an optical system located between the source of electromagnetic energy and the substrate support, wherein the optical system comprises an optical valve, wherein the optical valve comprises:
      a reflectivity switch layer facing the substrate support;
      an absorbing layer located on the reflectivity switch layer;
      a thermal resistor layer located on the absorbing layer; and
      a thermal bath layer located on the thermal resistor layer, wherein the thermal bath layer faces the source of electromagnetic energy.

7. The apparatus of claim 6, wherein the thermal resistor layer comprises silicon oxide.

8. The apparatus of claim 7, wherein the absorbing layer comprises a metal.

9. The apparatus of claim 6, wherein the reflectivity switch layer comprises titanium oxide or tantalum oxide, and has a peak reflectance at a wavelength that is different than a wavelength of the electromagnetic energy, wherein the wavelength of the peak reflectance of the reflectivity switch layer changes as a temperature of the reflectivity switch layer increases.

10. The apparatus of claim 6, wherein the thermal bath layer comprises multiple layers.

11. The apparatus of claim 6, wherein the optical system further comprises an aperture member coupled to the optical valve, wherein the optical valve is coplanar with a focal plane of the aperture member.

12. The apparatus of claim 6, wherein the optical valve is proximity focused on a plane adjacent to the substrate support.

13. An apparatus for thermally processing a substrate, comprising an optical valve, the optical valve comprising:
   a thermal bath layer;
   a thermal resistor layer;
   an absorbing layer; and
   a reflectivity switch layer, wherein the reflectivity switch layer comprises a first dielectric layer and a second dielectric layer contacting the first dielectric layer.

14. The apparatus of claim 13, wherein the thermal bath layer comprises aluminum oxide.

15. The apparatus of claim 13, wherein the thermal resistor layer comprises silicon oxide.

16. The apparatus of claim 13, wherein the absorbing layer comprises a metal.

17. The apparatus of claim 13, wherein the first dielectric layer comprises titanium oxide and the second dielectric layer comprises tantalum oxide.

18. The apparatus of claim 13, wherein the thermal resistor layer has a thermal resistivity that controls a temperature of the reflectivity switch layer.

19. The apparatus of claim 13, further comprising:
   a substrate support;
   a source of electromagnetic energy operable to produce pulses of electromagnetic energy that propagate toward the substrate support; and
   an optical system located between the substrate support and the source of electromagnetic energy, wherein the optical system comprises the optical valve.

20. The apparatus of claim 19, wherein the optical system further comprises an aperture member coupled to the optical valve.

* * * * *

UNITED STATES PATENT AND TRADEMARK OFFICE
CERTIFICATE OF CORRECTION

PATENT NO. : 9,958,709 B2
APPLICATION NO. : 14/459016
DATED : May 1, 2018
INVENTOR(S) : Bruce E. Adams It is certified that error appears in the above-identified patent and that said Letters Patent is hereby corrected as shown below:

In Columns 6-7, Lines 57-67 (Column 6) and Lines 1-3 (Column 7), delete "Teflon®. The energy blocking member 304 may be an opaque or reflective material, such as metal, reflective ceramic, or a dielectric mirror. The energy blocking member 304 may be formed and shaped, and the formed and shaped energy blocking member 304 applied to the first member 302 by direct contact, or formed directly by physical vapor deposition (PVD) technologies commonly used to from robust thin film in the optics industry. Alternately, the energy blocking member 304 may be deposited on the first member 302 and then etched to provide the opening 308. The second member 306 is typically applied to the energy blocking member 304 using techniques common to the high energy optics industry, such as direct bonding, an air gap, or UV curing epoxies." and insert the same on Column 6, Line 56, as a continuation of the same paragraph.

Signed and Sealed this
Third Day of July, 2018

Andrei Iancu
*Director of the United States Patent and Trademark Office*